(12) United States Patent
Svejcar et al.

(10) Patent No.: US 11,592,116 B2
(45) Date of Patent: Feb. 28, 2023

(54) FIVE PORT VALVE

(71) Applicants: Kyle Svejcar, Itasca, IL (US); Nishaj Attassery, Saint Johns, FL (US); Eapen Chacko, Itasca, IL (US)

(72) Inventors: Kyle Svejcar, Itasca, IL (US); Nishaj Attassery, Saint Johns, FL (US); Eapen Chacko, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 0 days.

(21) Appl. No.: 17/524,254

(22) Filed: Nov. 11, 2021

(65) Prior Publication Data
US 2022/0163124 A1    May 26, 2022

Related U.S. Application Data (60) Provisional application No. 63/118,064, filed on Nov. 25, 2020.

(51) Int. Cl.
*F16K 11/085* (2006.01)

(52) U.S. Cl.
CPC .................................. *F16K 11/085* (2013.01)

(58) Field of Classification Search
CPC ............................ F16K 11/085; F16K 11/0856
See application file for complete search history.

(56) References Cited

U.S. PATENT DOCUMENTS

| | | | | |
|---|---|---|---|---|
| 3,090,396 | A * | 5/1963 | Rudelick | F16K 11/0856 251/324 |
| 3,636,981 | A * | 1/1972 | Henry | F16K 11/0856 137/625.46 |
| 4,345,622 | A * | 8/1982 | Henningsson | F16K 11/00 137/637.1 |
| 4,355,659 | A * | 10/1982 | Kelchner | F16K 11/0856 137/625.19 |
| 4,445,540 | A * | 5/1984 | Baron | F16L 45/00 137/625.43 |
| 5,820,133 | A * | 10/1998 | Altshuler | F16K 11/0856 277/630 |
| 9,605,765 | B1 * | 3/2017 | Cheng | F16K 11/076 |
| 2003/0098077 | A1 * | 5/2003 | McLane | F16K 11/0856 137/625.47 |
| 2008/0029168 | A1 * | 2/2008 | Kinlaw | F16K 11/0856 137/597 |
| 2008/0223464 | A1 * | 9/2008 | Merrell | E04H 4/1209 137/625 |

(Continued)

*Primary Examiner* — Kevin R Barss
(74) *Attorney, Agent, or Firm* — Miller & Martin PLLC; Stephen J. Stark (57) ABSTRACT

A multiport valve has a plurality of inlets and outlets with selected positions to selectively direct fluid differently through the valve based on the position of the valve. A cylindrical exterior stemshell rotates internal to a housing to position channels and/or bores to provide the desired flow paths. Some flow paths are channels which extend linearly from one port to another, whether formed into an exterior surface, parallel to an axis of rotation of the stemshell, or pass from an inlet to an outlet in the exterior surface of the stemshell, preferably separated from flow from flow to an internal passage, which is preferably colinear with the axis of rotation, for at least some embodiments.

16 Claims, 11 Drawing Sheets

(56) References Cited

U.S. PATENT DOCUMENTS

| | | | |
|---|---|---|---|
| 2013/0074961 A1* | 3/2013 | Hong | F16K 27/065 137/597 |
| 2015/0135749 A1* | 5/2015 | Ohta | F16K 11/0856 62/151 |
| 2015/0260298 A1* | 9/2015 | Poggel | F16K 11/02 137/625 |
| 2017/0152957 A1* | 6/2017 | Roche | B60H 1/04 |
| 2017/0254425 A1* | 9/2017 | Takamatsu | F16K 37/005 |
| 2018/0372235 A1* | 12/2018 | Smith | F16K 11/0853 |
| 2019/0249787 A1* | 8/2019 | Whitaker | F16K 11/076 |

\* cited by examiner

FIVE PORT VALVE

CLAIM OF PRIORITY

This application claims the benefit of U.S. Provisional Patent Application No. 63/118,064 filed on Nov. 25, 2020, which is incorporated herein by reference in its entirety.

FIELD OF THE INVENTION

The present invention relates to a multiport valve such as a five port valve having multiple positions such as four distinct positions (flow configurations) amongst the various ports such as three inlet and two outlet ports.

BACKGROUND OF THE INVENTION

The applicant was requested by a customer to provide a fluid control valve which could operate in one of four different flow configurations amongst three inlet ports and two outlet ports. Specifically, the outlets ports are numbered 1 and 4, the inlet ports are numbered 2, 3, and 5. The customer requested that in the first position, port number 5 would be blocked off and inlet port 2 would direct to outlet port 1 while inlet port 3 would direct to outlet port 4. In position 2, inlet port 3 would direct to outlet port 1 and inlet port 5 would direct out to outlet port 4 with port 2 being blocked off. In position 3, inlet port 2 would direct to outlet port 4 and inlet port 3 would be blocked off and inlet port 5 would be directed to outlet port 1. Finally, for position 4, inlet port 2 would be blocked off and inlet port 3 would be directed to outlet 4 and inlet port 5 would be directed to outlet port 1.

Other than having similarly configured male fittings at the ports extending from the valve, the customer left the applicant to solve this problem. The desired flow paths needed to be provided to meet the objectives of the applicant's customer.

SUMMARY OF THE INVENTION

It is the object of many embodiments of the present invention to provide an improved five port valve having three inputs and two outputs capable of changing flow configurations in four separate positions of the valve.

It is the object of many embodiments of the present invention to provide an improved multi-port valve.

It is another object of many embodiments of the present invention to provide an improved four position valve, possibly having three inputs and two outputs.

It is another object of many embodiments of the present invention to provide an improved an ability to provide a specific flow path to connect specific inputs to specific outputs, preferably without mixing of the flow paths at the valve.

It is another object of many embodiments to provide selective positions at a valve to selectively direct specific inputs to specific outputs in a prearranged configuration while selectively securing one of the inputs and not mixing fluid streams internal to valve.

Accordingly, in accordance with many embodiments of the present invention a valve body is provided with a plurality of ports, such as four ports on an exterior cylindrical surface selected from ports 1-5. For many embodiments an additional port (port 1 or other port) may be located along an axis of a circumferential housing. By rotating an interior director, insert or stemshell which is preferably machined or otherwise formed to provide communication between specific ports when placed at specific angular relationships of the stemshell relative to the housing while preferably selectively securing one of the inputs. Additionally, specific ports can direct flow from specific inlet ports to specific outlet ports to accomplish multiple such as four different flow paths depending on the angular position or rotational position of the insert or stemshell relative to the housing.

When a first port is located coaxially along an axis of the housing, an insert having an internal passage may be utilized at various angular positions to communicate a port with a specific outlet port (including two separate inlet ports communicating separately with two separate outlet ports). Channels, such as in or along exterior surfaces external to and/or separate from the internal passage of the insert may be utilized to communicate a specific inlet port with a specific outlet port without inter mixing the fluid streams. Another inlet port may align with a bore through the stemshell in combination with the internal passage to direct fluid from an outlet port aligned with the stemshell axis.

Separate flow paths may be maintained based on the angular position of the insert which can have an actuator extending outwardly away from the first port and/or along the axis of the housing and/or insert for various embodiments so as to be operated by various electrical, mechanical and/or other actuators as are known in the art.

The applicant can align ports 2-5 in a common plane or space than about a circumference of the housing to potentially shorten a length of housing. Other embodiments may incorporate features of this invention with other port combinations and constructions.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE PREFERRED EMBODIMENT

Figure 1:
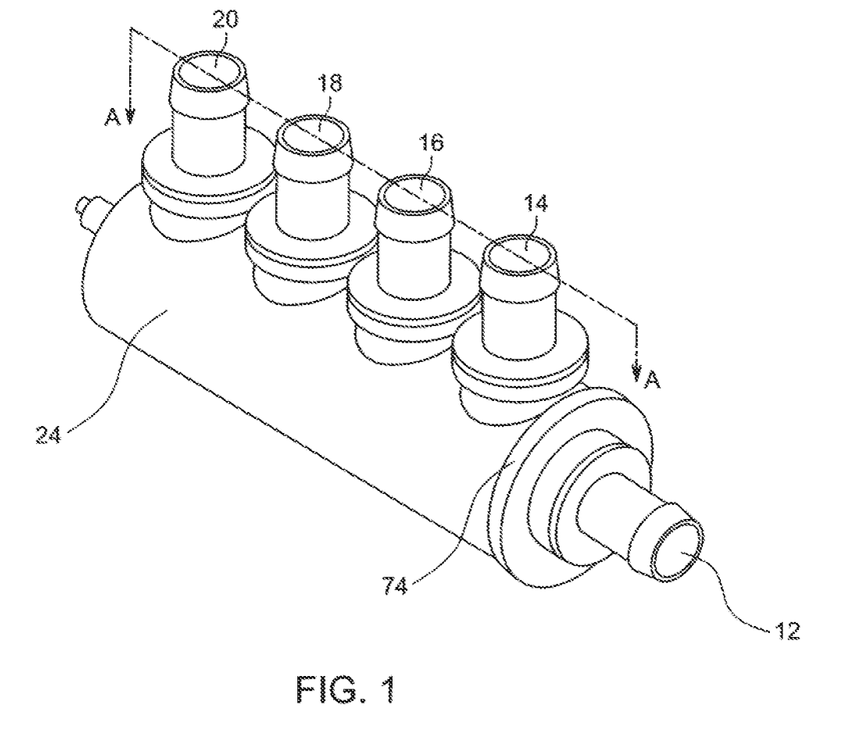
FIG. 1 is a front perspective view of a presently preferred embodiment of a valve of the present invention.
Figure 2:
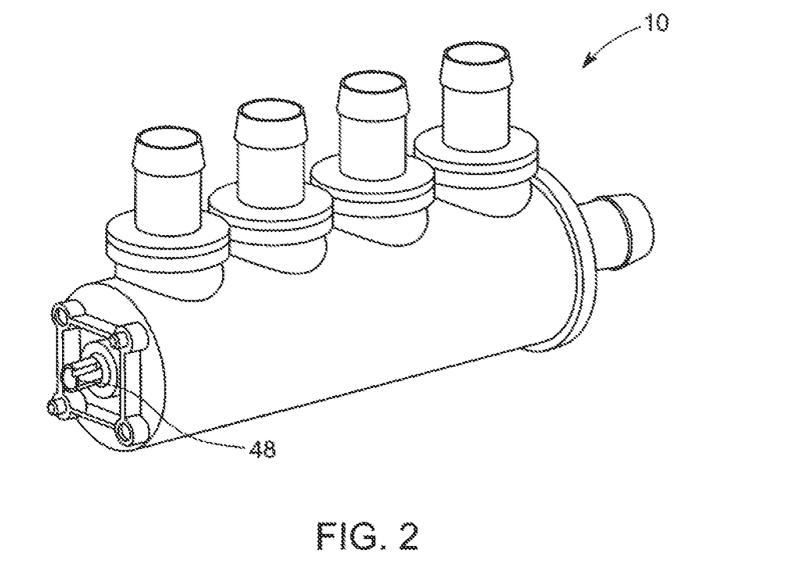
FIG. 2 is a rear perspective view of the embodiment shown in FIG. 1.
Figure 3:
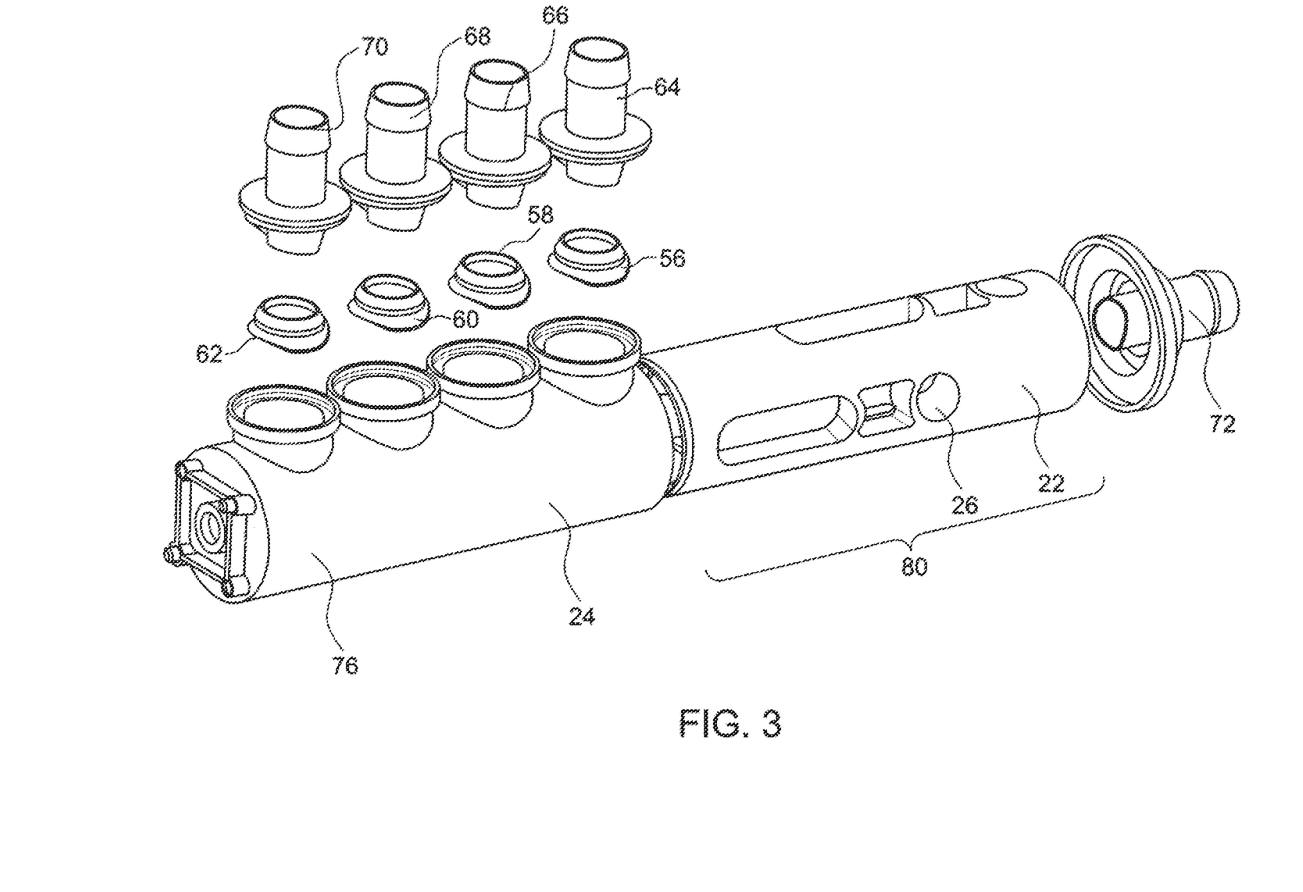
FIG. 3 is an exploded view of the valve in FIGS. 1-2.

FIG. 1 shows a valve 10 of a presently preferred embodiment. The valve has first, second, third, fourth and fifth ports 12,14,16,18,20 respectively. The first through fifth ports 12-20 for many embodiments are dedicated inlet or outlet ports. Specifically, first port 12 and fourth port 18 have been designed outlet ports for the illustrated embodiments, while second, third and fifth ports 14,16,20 respectively have been designed inlet ports. Other embodiments may have different inlet/outlet ports and/or ports that may not necessarily be dedicated to only inlet or outlet ports. Various fluids whether liquid and/or gas may flow through various embodiments of valve 10.

A different position of the stemshell 22 or insert relative to the housing 24 is calculated to provide different flow paths from the various inputs 14,16,20 to be directed to specific outputs 12,18.

The stemshell 22 is preferably substantially cylindrical in nature and may selectively align with one of three ports such as inlet ports 14,16,18 on the housing 24 illustrated directing fluid selectively through bores 26,29,30,32 to an interior passage 28 in communication with first port 12. Meanwhile, channels such as first channel 34, second channel 36, third channel 38 and forth channel 40 (having inlet 42 and outlet 44) may be selectively utilized to communicate specific ports such as second, third and fifth ports 14,16,20 with fourth port 18 (an outlet port) while allowing one of the other inlet ports 14,16,20 to communicate with the outlet first port 12.

Figure 4:
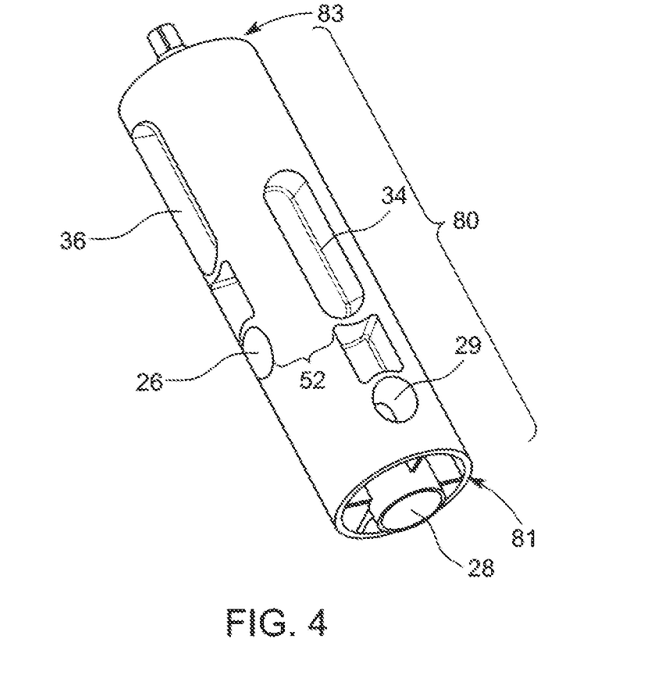
FIG. 4 is a top perspective view of an insert or stemshell utilized in the valve of FIGS. 1-3.
Figure 5:
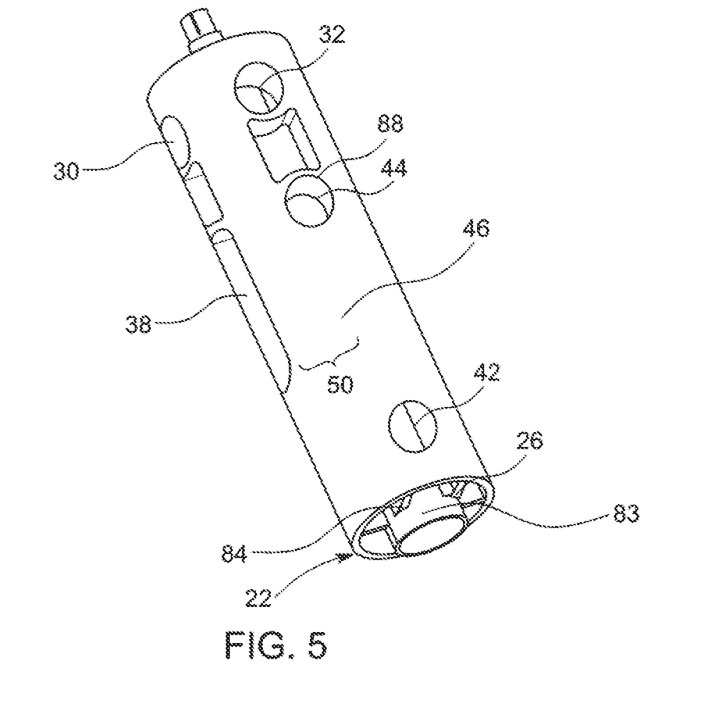
FIG. 5 is a bottom perspective view of the embodiment shown in FIG. 4.
Figure 6:
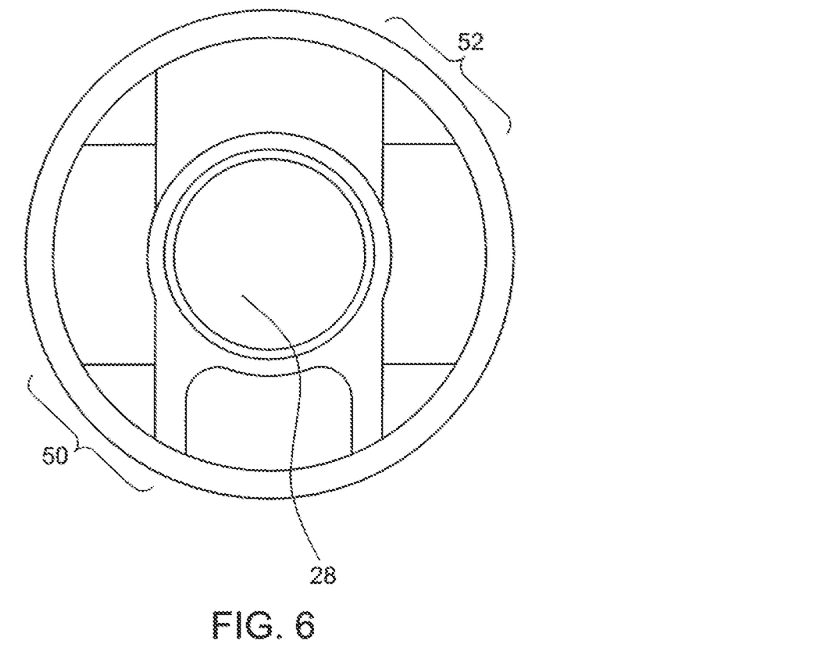
FIG. 6 is a front plan view of the stemshell shown in FIGS. 4-5.

Bores 26,29,30,32 proceed through external surface 46 of stemshell 22 sufficiently to communicate with interior passage 28. The fourth channel 40 with inlet 42 and outlet 44 can be partially internal to exterior surface 46 of stemshell 22 but still fluidly separate from interior passage 28 (i.e., not in fluid communication with interior passage). Other channels such as first, second and third channels 34,36,38 may extend into the exterior surface 46 as illustrated in FIGS. 4 and 5. FIG. 6 shows the interior passage 28.

Figure 7:
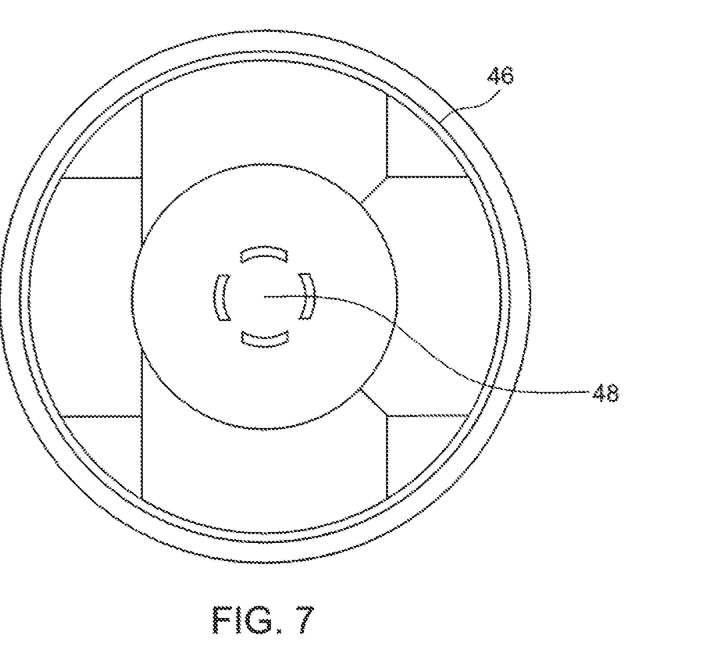
FIG. 7 is a rear plan view of the stemshell shown in FIGS. 4-6.

FIG. 7 shows a stem or operator 48 which could cooperate with an actuator (not shown) to selectively angularly orient the stemshell 20 to a desired angular relationship relative to the housing 24 with the second, third, fourth and fifth ports 14,16,18,20 so as to direct a specific flow from specific input ports 14,16,20 to specific outlet ports 12,18 while preventing mixing internal to the valve 10 and shuttling off one of the inlet ports 14,16,20 (angular positions of 0, 90, 180 and 270 degrees achieve the positions for the illustrated embodiment. Other embodiments could employ other positional or angular relationships.).

For many of the embodiments the specific flow paths are circumferentially spaced apart by segments such as spacing segments 50,52 and others of the stemshell 22 along exterior surface 46. Whereby if rotated out of one of the specific positions (1-4 or others) in a spacing segment 50,52, then none of the channels, bores or flow paths are accessed. An angular position of 45 degrees, or other angular position, could shut off the valve 10 for at least some embodiments. It is preferred that the operator 48 (with an actuator, such as a motor, knob, etc. not shown) not be positionable in these intermediate positions along spacing segments 50,52 for many embodiments but select one of the specific positions (angular relationship of stemshell 22 with housing 24) under which the valve is designed to operate. This may make more sense in reference to FIGS. 8-11.

Figure 8:
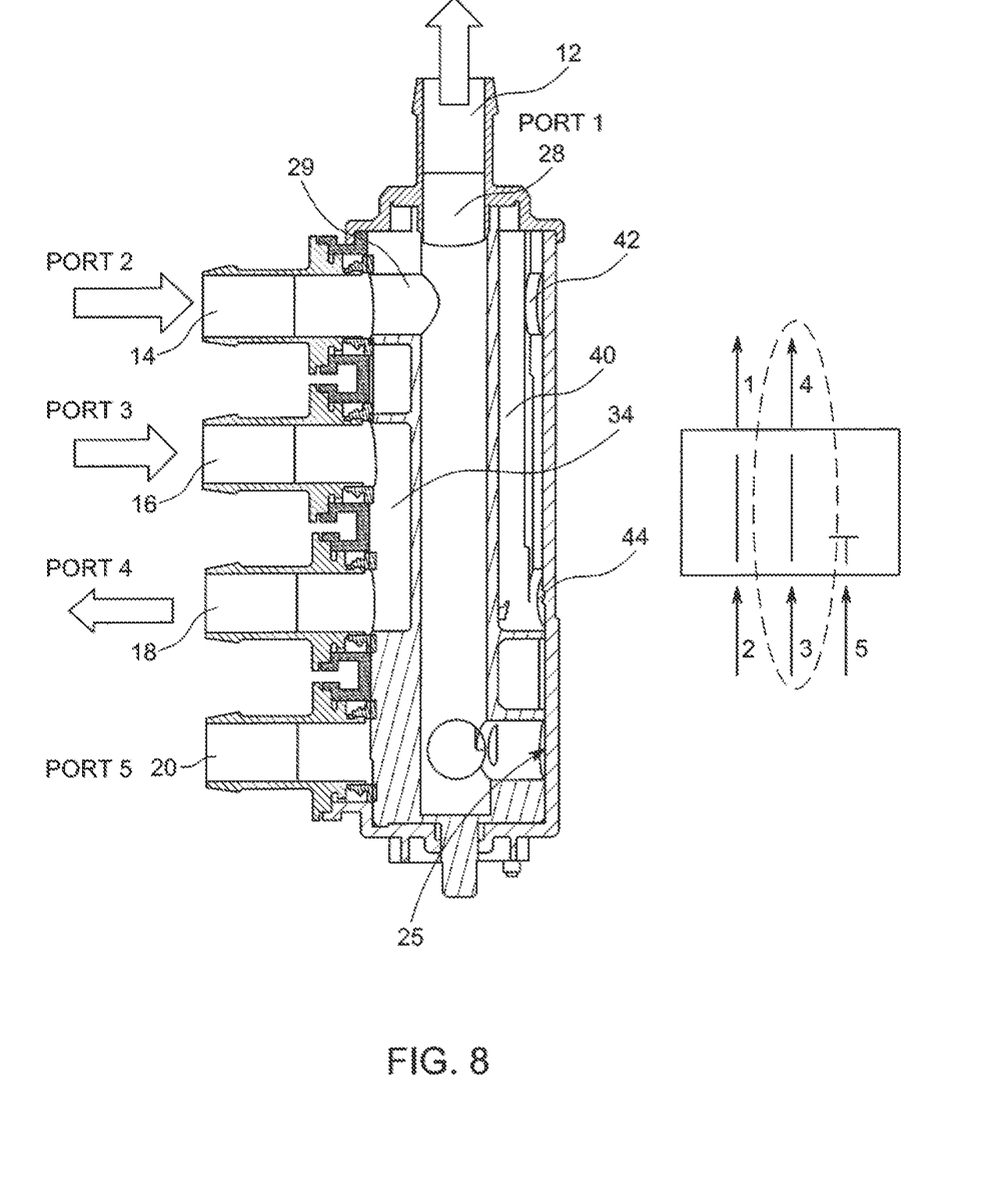
FIG. 8 is a cross-sectional view taken along the line AA of FIG. 1 with the stemshell in a first position.

Specifically, FIG. 8 shows the first position with the second port (inlet port) 14 directing flow out the first outlet port 12 and the third port 16 directed flow out the fourth port 18 utilizing the first channel 34 to communicate the third port 16 with the fourth port 18. The third bore 29 directs fluid to the internal bore 28 and then through the first port 12.

Figure 9:
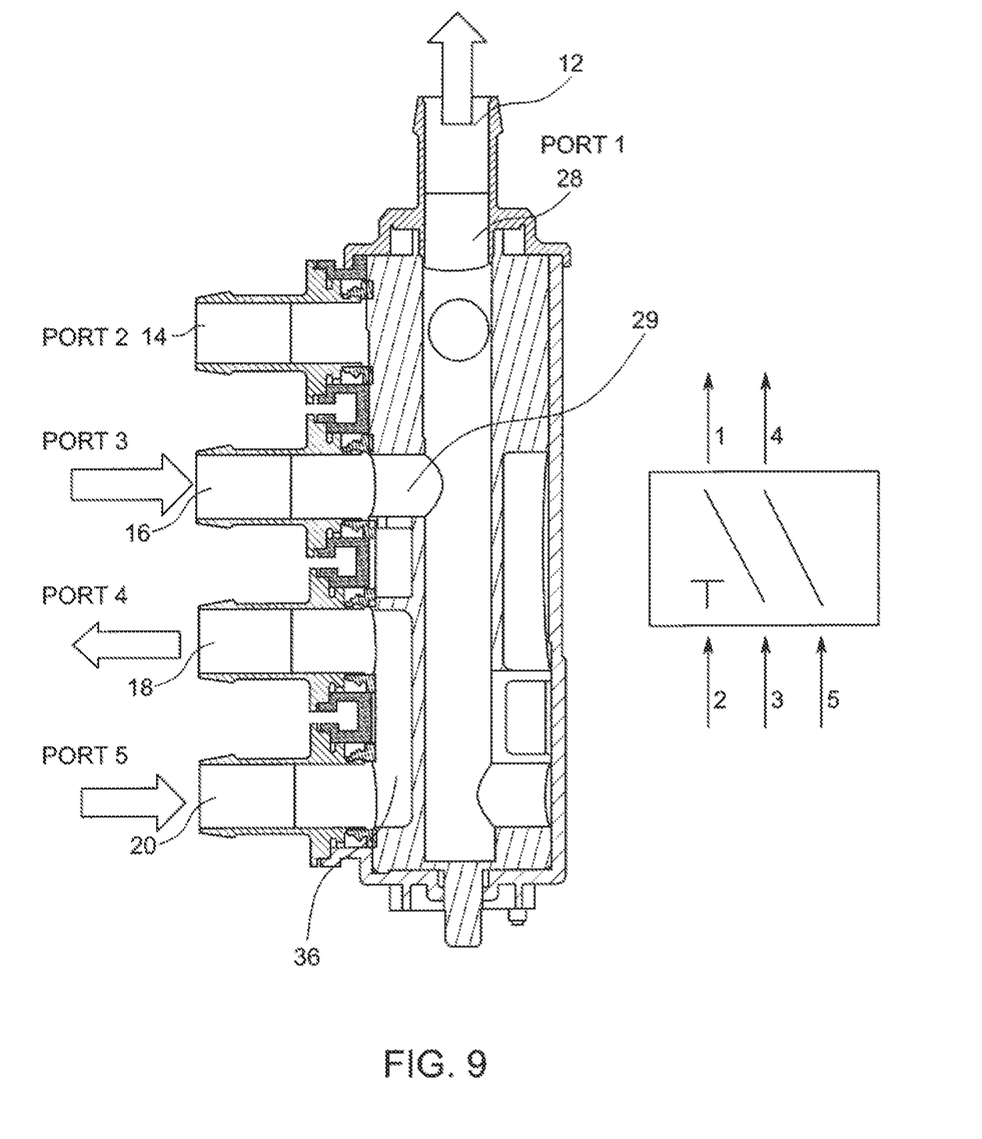
FIG. 9 is a cross-sectional view of FIG. 8 show in a stemshell in a second position.
Figure 10:
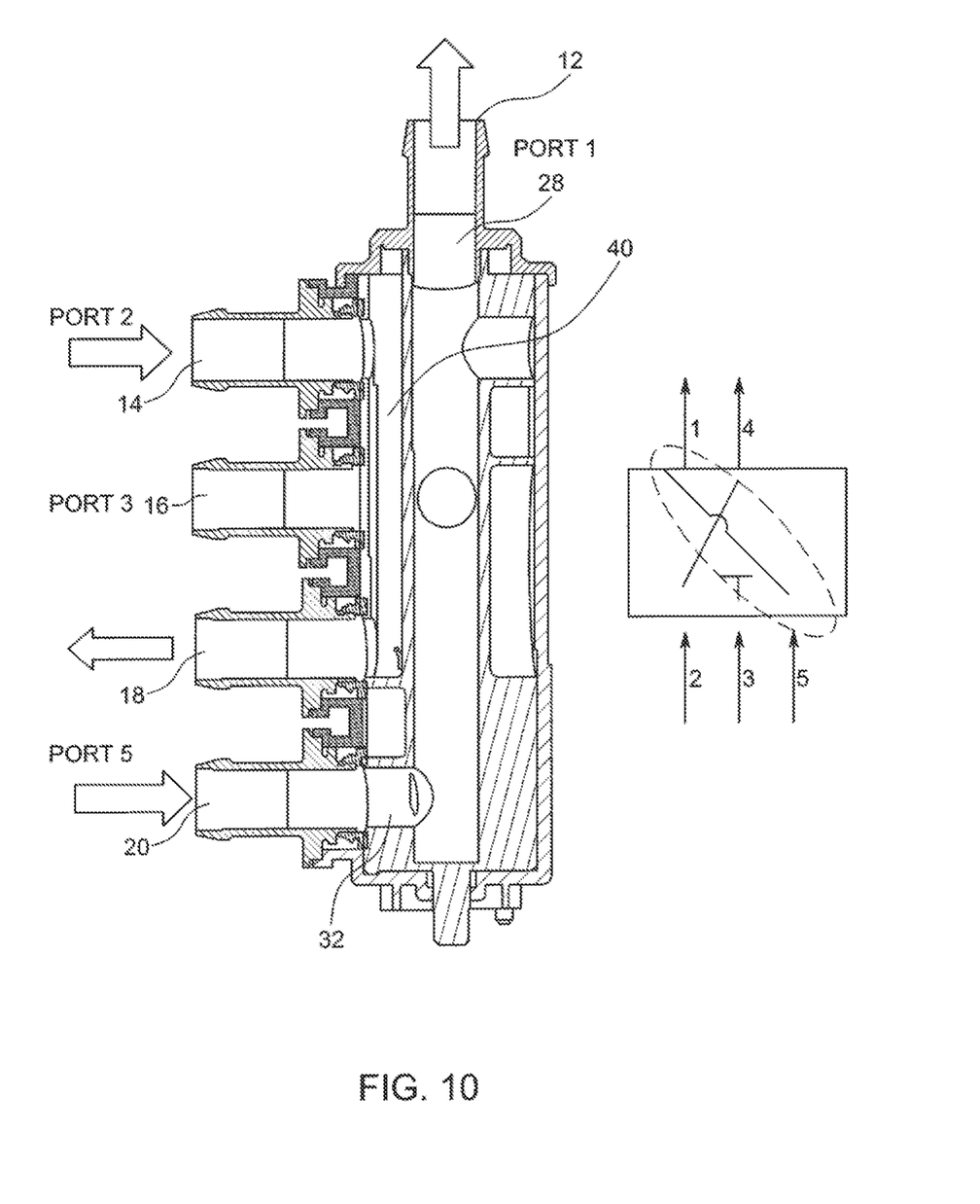
FIG. 10 is a cross-sectional view of FIGS. 8-9 with the stemshell in the third position.

FIG. 9 shows the second channel 36 communicating the fifth port 20 with the fourth port 18 (an outlet port) while the third port 16 (an inlet port) directs fluid through the first bore 26 into the internal passage 28 to the first port 12. The second port 14 is preferably not in communication with any of the other ports in this embodiment just like the fifth port 20 is preferably not in communication with the other ports 12-18 in FIG. 8. FIG. 9 shows the second port 14 (an inlet port) in communication with the fourth port 18 (an outlet port) through the fourth channel 40, while the fifth port 20 (an inlet port) directs fluid flow through fourth bore 32 into the internal passage 28 and out the first port 12 (an outlet port). In this embodiment the third port 16 has no flow proceeding through it.

Figure 11:
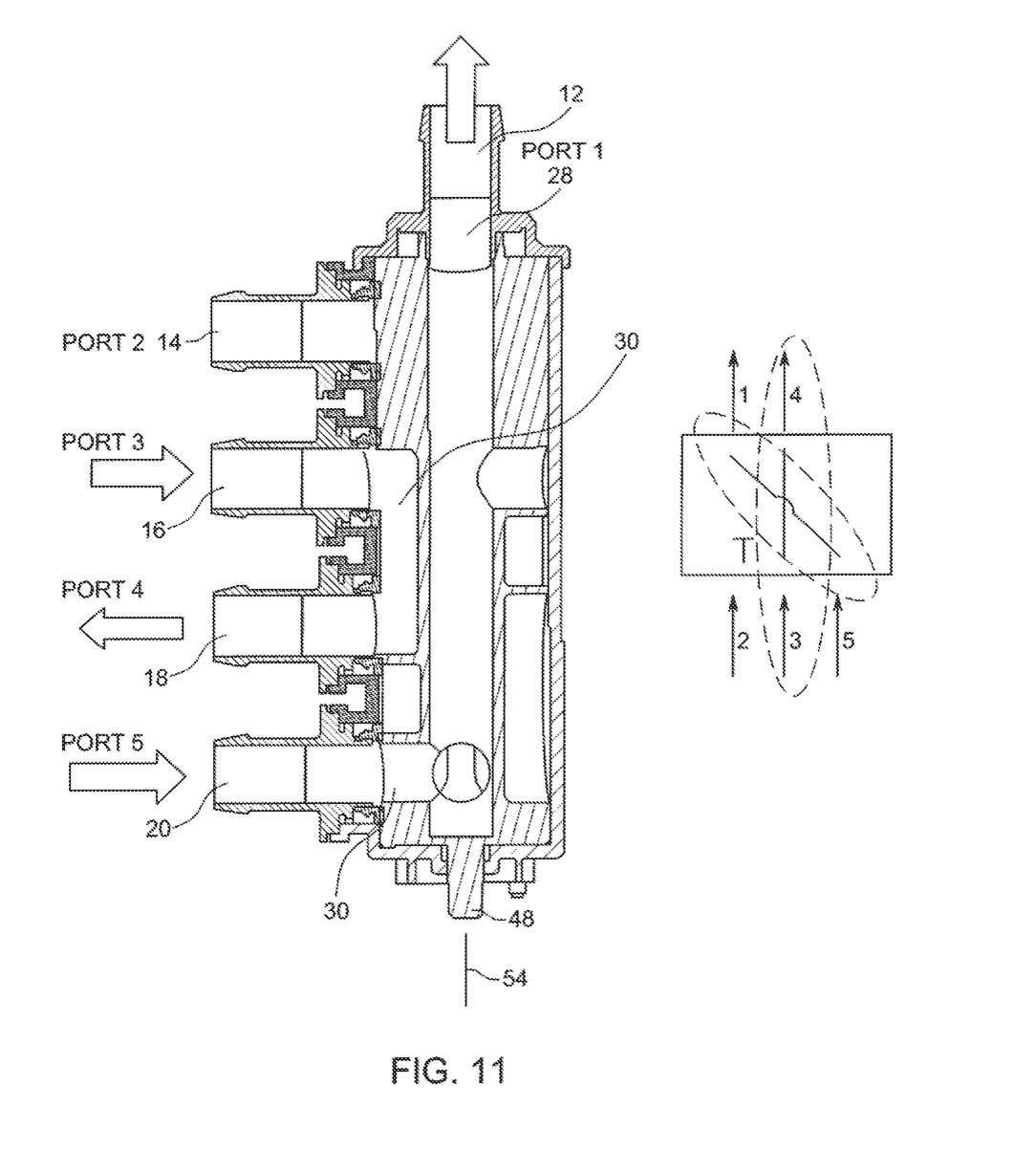
FIG. 11 is a cross-sectional view shown with the stemshell in the fourth position.

Finally, FIG. 11 shows the second port 14 (an inlet port) being secured while the third port 16 (an inlet port) directs fluid through the third channel 38 and out the fourth port 18 (an outlet port) and the fifth port 20 (an inlet port) directs fluid through the third bore 30 and out the internal passage 28 and the first port 12 (an outlet port) for this angular configuration of the stemshell 22 relative to the housing 24. Operator 48 is shown extending from the housing 24 along a radial axis 54 which may be colinear with the first port 12 for at least some embodiments. The second, third, fourth and fifth ports 14,16,18,20 may be coplanarly arranged along a specific orientation relative to the housing 24 along an exterior surface 76 for at least some embodiments and sealed with seals. Second, third, fourth and fifth seals 56,58,60,62 may be useful to connect port bodies such as second through fifth port bodies 64-70 to the housing 24 while the first port body 72 may connect to an end 74 of the housing 24 or otherwise possibly with a first seal (not shown) for various embodiments. There are many different possible connections which may connect the port bodies 64-72 to the housing 24 as would be understood by those of ordinary skill in the art. Other embodiments may have other flow paths, positions, port placement and/or number of ports.

Channels 34,36,38,40 may extend parallel to axis 54 for at least some embodiments, particularly with this construction. Other embodiments may have different orientations of channels 34-40.

Figure 12:
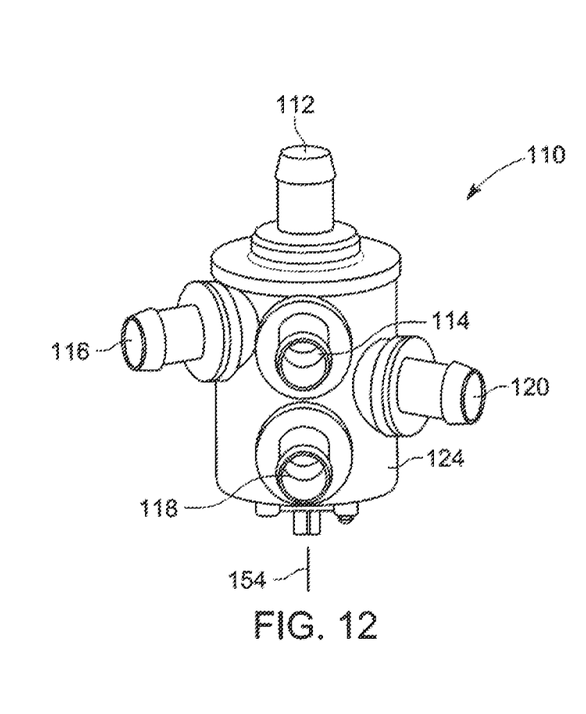
FIG. 12 is a front perspective view of an alternative embodiments of the valve shown in FIGS. 1-11.
Figure 13:
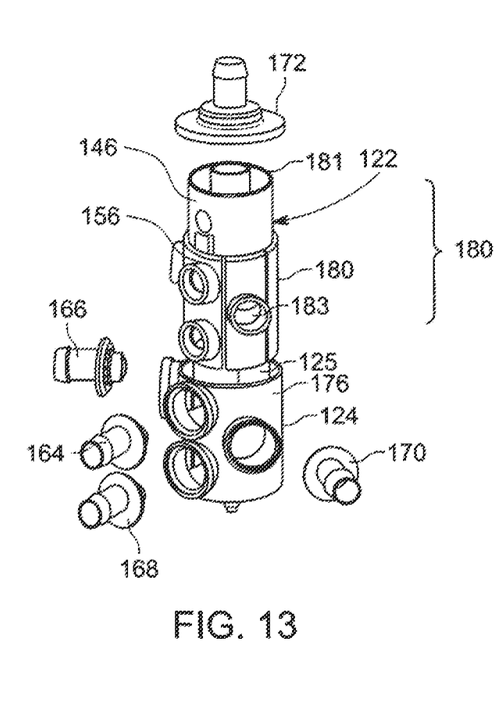
FIG. 13 is an exploded view of the valve shown in FIG. 12.

As it relates to port placement, FIG. 12 shows an alternatively preferred embodiment of a valve 110 having first port 112, second port 114, third port 116, fourth port 118 and fifth port 120. Second through fifth ports 112-120 are not linearly arranged or coplanar as is illustrated with the first embodiment, but instead are dispersed about the exterior surface 176 of housing 124 as would be understood by those of ordinary skill in the art. Nevertheless, with this construction, the angular position of the stemshell 122 relative to any of the second through fifth ports 114,116,118,120 select the flow paths of the various inlets such as the second, third, and fifth ports 114,116,120 relative to the outlet ports, namely the first port 112 and the fourth port 118. FIG. 13 shows the port bodies 164,166,68,170,172 removed from the housing 124.

Figure 14:
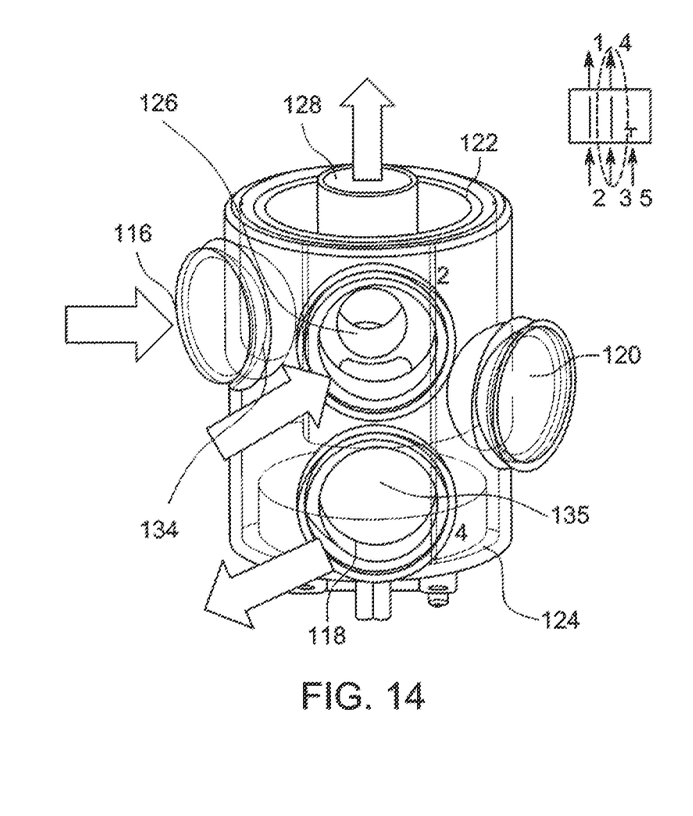
FIG. 14 is a front perspective view of a portion of the valve shown in FIGS. 12 and 13 showing the flow paths in the first position with the housing shown in phantom.

For instance, FIG. 14 shows the housing 124 in phantom with the second, third and fourth and fifth ports 114,116, 118,120 and the internal stemshell 122 at first position relative to the housing 124 with the same flow path as for the first embodiment. The first port 112 receives flow from the second port 114 through a first bore 126 directed through the stemshell 122 through the internal bore 128, and the third port 116 directs fluid through the fourth port 118 by proceeding through first channel 134. Meanwhile the fifth port 120 is not in communication with any of the other ports.

Figure 15:
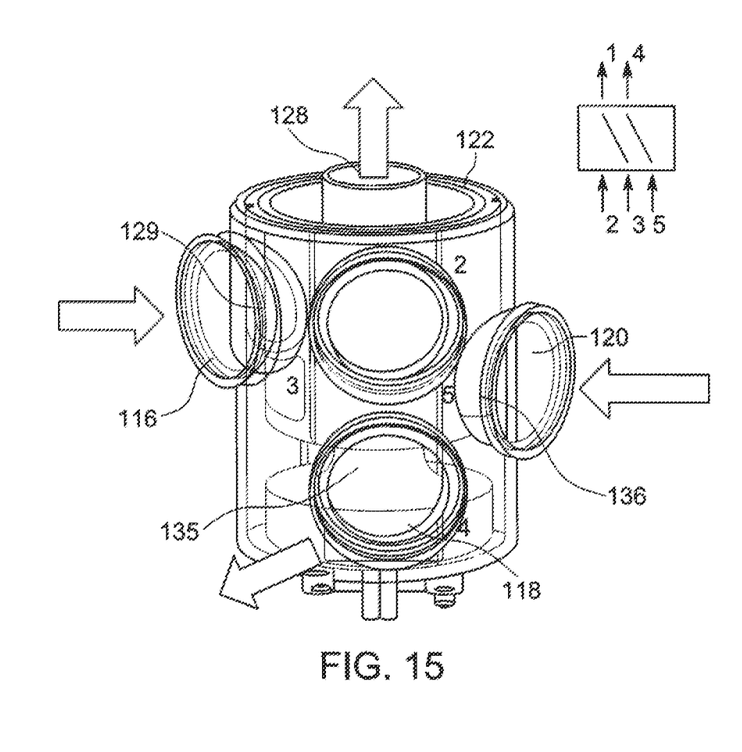
FIG. 15 is a front perspective view of the valve shown in FIGS. 12-14 showing a second position of different flow paths than the first position.

Referring to FIG. 15, which is the second position, the third port 116 is an inlet port directing flow through the internal passage 128 and out the first port 112 from a second bore 129, while the fifth port 120 (inlet port) directs fluid through the fourth port 118 (outlet port) such as through a second channel 136 and groove 135 and then out of the fourth port 118 or directly from a channel into or in the stemshell 122 as would be understood by those of ordinary skill in the art.

Figure 16:
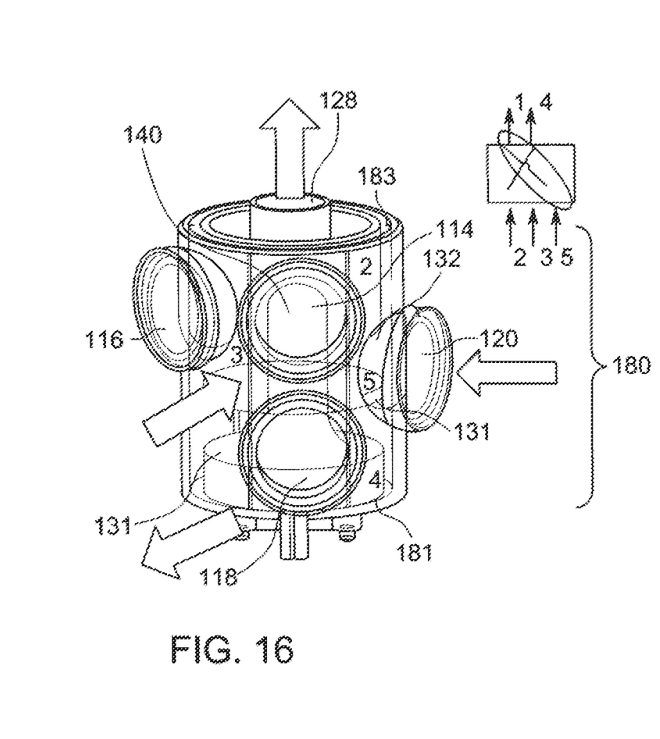
FIG. 16 is a front perspective view of the alternatively preferred embodiment of the valve in a third position showing those flow paths.

Meanwhile FIG. 16 shows a third position in which the fifth port 120 (an inlet port) directs fluid through bore 132 and into the internal passage 128 to be directed out of the first port 112 while the second port 114 directs fluid along channel 140 which may be in communication with groove 135 to direct fluid out of the fourth port 118. The third port 116 may be secured in this embodiment.

Figure 17:
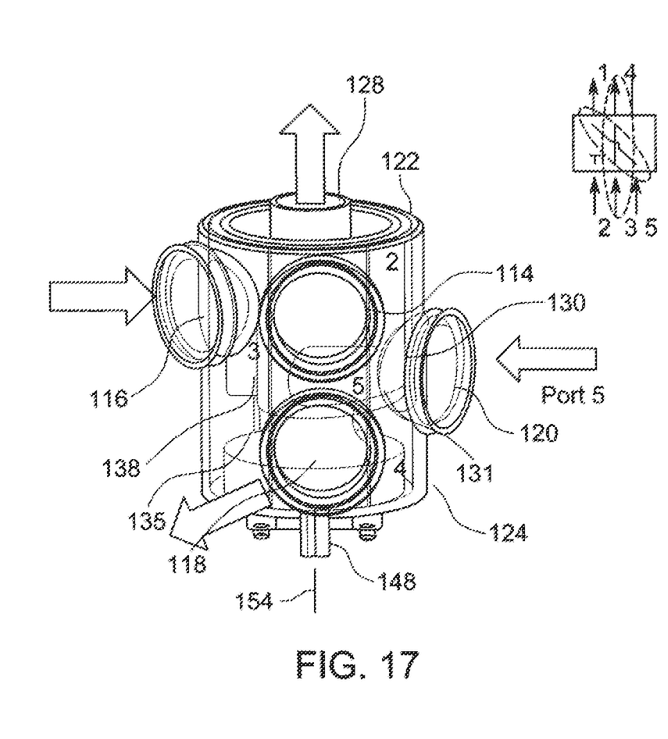
FIG. 17 is a front perspective view of a portion of the valve showing a fourth position with yet different flow paths.

In FIG. 17 the second port 114 is secured while flow from the third port 116 is directed through and out the fourth port 118. Flow into the fifth port 120 is directed out the first port 112. In the fourth position shown in FIG. 17 the third port 116 communicates with channel 138 and groove 135 with the fourth port 118 while the fifth port 112 directs fluid through bore 130 into the internal passage 128 and out the first port 112 (not shown).

The operator 148 is moved such as with an actuator (not shown) to be rotated to a desired angular position relative to the housing 124 so as to turn or otherwise orient the stemshell 122 to the desired angular position relative to the housing 124 to affect the flow paths described above. The actuator (not shown) may move the operator 148.

The housings 24,124 and/or inserts 22,122 may be made of appropriate materials as are known in the art. Molding, such as injection molding, may be appropriate for some embodiments.

For the first embodiment, the channels 34,36,38, may be directed along or into an exterior surface 46 of the stemshell 22. Molding, machining and/or other forming techniques may be utilized. Channel 40 may be internally disposed relative to the exterior surface 46 between inlet 42 and outlet 44 which could be accomplished by drilling or otherwise providing inlet and outlet 44 while providing the channel 40 external to an internal tube 83 (walls 84,86,88 may assist in defining channel 40 as well) surrounding the internal passage 28 as would be understood by those of ordinary skill in the art. Various other ways of providing the channels as well as the bores 26,29,30,32 could be provided so as to communicate specific ports of the first through fifth ports 12-20 with each other in the configurations as provided herein or otherwise depending on the needs and directives of the customer.

In a similar manner, the stemshell 122 of the alternatively preferred embodiment of the valve 110 can have various channels such as channels 134,136,138,140 possibly in combination with one or more grooves 135 so as to affect the desired flow paths. Groove(s) 135 may circumnavigate an exterior surface 146 of the stemshell 122 and may be perpendicularly oriented relative to channels 134-140 which may extend parallel to the axis 154. Groove(s) 135 preferably are not in fluid communication with interior passage 128.

One can see that the length 180 of the length of the housing 124 can be shorter than the length 80 of the housing 22 of the first embodiment by the positioning of the ports 114,116,118,120 circumferentially about the exterior surface 148 of the housing 124 as opposed to colinearly/coplanar with an axis of the housing 124 thereon.

Additionally, a sleeve 156 may be installed relative to the stemshell 122 and housing 124 as would be understood by those of ordinary skill in the art to provide a seal. Each of the port stems of the various first and second embodiments may connect to the housings 24,124 in various ways as would be understood by those of ordinary skill in the art.

For many embodiments the insert 22 has a cylindrical exterior surface 46 over much of its length 80. For at least some angular relationships of the housing 24, an interior surface 25,125 cooperates with an interior surface of the cylinder or housing 22,122 to permit the insert 22,122 to rotate relative to the housing 124 so as to selectively align bores such as 26,29,30,32 with a central bore 28 which may be located along axis 54,154 in the various positions and one of the input ports such as second port 14, third port 16 and/or fifth port 20.

As it relates to a channel such as channels 34,36,38,40, the channels are located internal to the ends (81,83) (181,183) within the length 80,180 of the inserts 22,122 preferably along the exterior surface 46. Channels 34,36,38 are also preferably spaced inwardly from ends 81,83 along length 80, etc. These may be constructed such as by machining into the exterior surface 46, forming into the exterior surface 46, or otherwise providing to sufficiently to communicate the channels 34,36,38 with the appropriate inlet ports 14,15,20 and outlet ports 12,20.

It would be further observed that the bores such as 26,29,30,32 are located internal to the ends 81,83 (181,183) of the lengths 80,180 of the inserts 22,122 as well for the illustrated embodiments.

While first port 12 is located on axis 54,154 of the housing 24 and insert 22 the other outlet port, namely fourth port 18 is located on exterior surface of the housing 24,124. Additionally, the other input ports, namely second port 14, third port 16 and fifth port 20 may be located on the exterior surface of the housing 24,124. Other embodiments may not have a first port 12,112 along an axis 54,154 of the insert 22,122.

For the embodiment of FIGS. 12-17, when utilizing a groove 135, the groove 135 is preferably located internal to the length 180 of the insert 120 and spaced from the ends such as illustrated while also being in communication with the appropriate channel such as any of channel 134,136,138, 140 as appropriate for the various positions. Ledge 131 may define a portion of the groove 135 and may be utilized to fluidly separate the bore 132 (and possibly others) from the groove 135 so that the fluid flowing in the fifth port 120 proceeds in the bore 132 is fluidly separated by lip 131 from the groove 135 and into the interior passage 128 and out the first port 112. The lip or edge 131 would block all but the appropriate channel such as channel 140 shown in FIG. 16 with other portions of the edge 131 blocking other ports such as bore 130 from fluid communication with groove 135 in FIG. 17 and others.

The insert 122 proceeds from first end 181 to second end 183 along length 180 while the other embodiment of the insert proceeds from first end 81 to second end 83 along the length 80 for that insert. The diameter of the insert 22,122 preferably cooperates with the interior diameter of the housing 24,124 to permit rotation thereabout while also preferably assisting in sealing so that flow does not tend to pass about the space locations 50,52 and/or others.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A fluid control valve comprising:
   a housing having inlet ports selected from the group of at least a first and a second inlet port and outlet ports selected from the group of at least a first and a second outlet port;
   a stemshell having a substantially cylindrical exterior surface cooperates with the housing to selectively direct fluid from selected inlet ports to selected outlet ports, said stemshell rotatable about a longitudinal axis internal to the housing;
   a first channel extending a depth into the cylindrical exterior surface of the stemshell and extending linearly a length parallel to the longitudinal axis, said first channel forming a portion of a passage outwardly directed and exposed towards to the housing to thereby communicate an inlet port with an outlet port in at least a first selected position of the stemshell relative to the housing; and
   wherein the inlet ports further comprise a third inlet port.

2. The fluid control valve of claim 1 wherein when in a selected position of the stemshell relative to the housing, flow through one of the inlet ports is secured while flow is directed selectively from the other two of the first, second, and third inlet ports to respective outlet ports of the first and second outlet ports.

3. The fluid control valve of claim 2 wherein when the stemshell is in a first position, flow from the first inlet port is directed to the first outlet port, flow from the second inlet port is directed to the second outlet port and flow from the third inlet port is blocked at the valve;
   when the stemshell is in a second position, flow from the second inlet port is directed to the second outlet port, flow from the third inlet port is directed to the first outlet port and flow from the first inlet port is blocked at the valve;
   when the stemshell is in a third position, flow from the third inlet port is directed to the first outlet port, flow from the first inlet port is directed to the second outlet port and flow from the second inlet port is blocked at the valve; and
   when the stemshell is in a fourth position, flow from the second inlet port is directed to the first outlet port, flow from the third inlet port is directed to the second outlet port and flow from the first inlet port is blocked at the valve.

4. The fluid control valve of claim 1 wherein the stemshell has a second channel extending linearly along the cylindrical exterior surface of the stemshell parallel to the longitudinal axis, forming a portion of a passage outwardly directed and exposed towards to the housing to thereby communicate an inlet port with an outlet port in at least a second selected position of the stemshell relative to the housing, said second channel proceeding parallel to the longitudinal axis of stemshell, said second selected position rotated from the first selected position, said second channel radially spaced apart from the first channel.

5. A fluid control valve comprising:
   a housing having inlet ports selected from the group of at least a first and a second inlet port and outlet ports selected from the group of at least a first and a second outlet port;
   a stemshell having a substantially cylindrical exterior surface cooperates with the housing to selectively direct fluid from selected inlet ports to selected outlet ports, said stemshell rotatable about a longitudinal axis internal to the housing;
   a first channel extending a depth into the cylindrical exterior surface of the stemshell and extending linearly a length parallel to the longitudinal axis, said first channel forming a portion of a passage outwardly directed and exposed towards to the housing to thereby communicate an inlet port with an outlet port in at least a first selected position of the stemshell relative to the housing; and
   wherein at least three of a group selected from the inlet and outlet ports are oriented linearly along the housing parallel to the longitudinal axis of the stemshell.

6. A fluid control valve comprising:
   a housing having inlet ports selected from the group of at least a first and a second inlet port and outlet ports selected from the group of at least a first and a second outlet port;
   a stemshell having a substantially cylindrical exterior surface cooperates with the housing to selectively direct fluid from selected inlet ports to selected outlet ports, said stemshell rotatable about a longitudinal axis internal to the housing;
   a first channel extending a depth into the cylindrical exterior surface of the stemshell and extending linearly a length parallel to the longitudinal axis, said first channel forming a portion of a passage outwardly directed and exposed towards to the housing to thereby communicate an inlet port with an outlet port in at least a first selected position of the stemshell relative to the housing;
   wherein the stemshell has a second channel extending linearly along the cylindrical exterior surface of the stemshell parallel to the longitudinal axis, forming a portion of a passage outwardly directed and exposed towards to the housing to thereby communicate an inlet port with an outlet port in at least a second selected position of the stemshell relative to the housing, said second channel proceeding parallel to the longitudinal axis of stemshell, said second selected position rotated from the first selected position, said second channel radially spaced apart from the first channel; and
   wherein the stemshell has a third channel extending linearly along the cylindrical exterior surface of the stemshell parallel to the longitudinal axis, forming a portion of a passage outwardly directed and exposed towards to the housing to thereby communicate an inlet port with an outlet port in at least a third selected position of the stemshell relative to the housing, said third channel proceeding parallel to the longitudinal axis of stemshell, and said third selected position rotated from the first and second selected position, said third channel radially spaced apart from the first channel.

7. The fluid control valve of claim 6 wherein the stemshell has a fourth channel extending from an inlet into the cylindrical exterior surface of the stemshell to an outlet from the cylindrical exterior surface of the stemshell, said fourth channel proceeding internally to the stemshell between the inlet and the outlet while extending a length parallel to the longitudinal axis, said fourth channel communicating an inlet port with an outlet port in at least a fourth selected position of the stemshell relative to the housing, said fourth channel proceeding parallel to the longitudinal axis of stemshell, said fourth selected position rotated from the first selected position, said fourth channel radially spaced apart from the first channel.

8. The fluid control valve of claim 7 further comprising a bore extending into the cylindrical exterior surface of the stemshell communicating with an interior passage fluidly separate from the fourth channel, the interior passage extending a direction parallel to the longitudinal axis, in the at least first selected position.

9. The fluid control valve of claim 8 wherein the interior passage is colinear with the longitudinal axis.

10. The fluid control valve of claim 7 wherein the inlet in the cylindrical exterior surface of the stemshell is spaced by at least one inlet port or outlet port in a direction parallel to the longitudinal axis from the outlet.

11. The fluid control valve of claim 10 further comprising a first groove circumnavigating the exterior surface of the stemshell in a plane perpendicular to the longitudinal axis of the stemshell to a depth, said groove in communication with the first channel to thereby communicate the inlet port with the outlet port in the first selected position.

12. The fluid control valve of claim 11 further comprising a second bore into the cylindrical exterior surface of the stemshell in communication with an interior passage, whereby when the stemshell is rotated from the first to a second position, a selected inlet port remains in communication with a selected outlet port at the first and second positions and positions in between.

13. The fluid control valve of claim 11 further comprising an internal bore in the stemshell and a bore extending from the cylindrical exterior surface of the stemshell, said bores in communication with an interior passage fluidly separate from the first channel while passing along a direction parallel to the longitudinal axis, in the at least the first selected position.

14. A fluid control valve comprising:
a housing having inlet ports selected from the group of at least a first and a second inlet port and outlet ports selected from the group of at least a first and a second outlet port;
a stemshell having a substantially cylindrical exterior surface cooperating with the housing to selectively direct fluid from selected inlet ports to selected outlet ports, said stemshell rotatable about a longitudinal axis internal to the housing;
a first channel extending from an inlet into the cylindrical exterior surface of the stemshell to an outlet emerging from the cylindrical exterior surface of the stemshell while proceeding along a first interior passage internally to the stemshell, said first interior passage extending a length parallel to the longitudinal axis, said first interior passage communicating a selected inlet port with a selected outlet port in at least a first selected position of the stemshell relative to the housing.

15. The fluid control valve of claim 14 further comprising a first channel extending a depth into the cylindrical exterior surface of the stemshell while extending a length parallel to the longitudinal axis, said second channel forming a portion of a passage outwardly directed and exposed towards to the housing to thereby communicate an inlet port with an outlet port in at least a second selected position of the stemshell relative to the housing, said second channel radially spaced from the first selected position of the stemshell relative to the housing.

16. The fluid control valve of claim 14 further comprising an internal bore in the stemshell and a bore extending from the cylindrical exterior surface of the stemshell to a second interior passage fluidly separate from the first interior passage, said second interior passage oriented in a direction parallel to the longitudinal axis, in the at least the first selected position.

* * * * *